US012770877B2

(12) United States Patent
Park et al.

(10) Patent No.: US 12,770,877 B2
(45) Date of Patent: Oct. 20, 2026

(54) POSITIVE ELECTRODE INCLUDING SULFUR-CARBON COMPOSITE AND LITHIUM-ION SECONDARY BATTERY INCLUDING THE SAME

(71) Applicant: LG ENERGY SOLUTION, LTD., Seoul (KR)

(72) Inventors: In-Tae Park, Daejeon (KR); Yong-Hwi Kim, Daejeon (KR); Seong-Hyo Park, Daejeon (KR); Myeong-Jun Song, Daejeon (KR); Hyun-Soo Lee, Daejeon (KR); Ran Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 602 days.

(21) Appl. No.: 18/267,765

(22) PCT Filed: Oct. 31, 2022

(86) PCT No.: PCT/KR2022/016849

§ 371 (c)(1),
(2) Date: Jun. 15, 2023

(87) PCT Pub. No.: WO2023/075555

PCT Pub. Date: May 4, 2023

(65) Prior Publication Data

US 2024/0113297 A1 Apr. 4, 2024

(30) Foreign Application Priority Data

Oct. 29, 2021 (KR) ........................ 10-2021-0147384

(51) Int. Cl.
*H01M 4/00* (2006.01)
*H01M 4/136* (2010.01)
(Continued)

(52) U.S. Cl.
CPC ........... *H01M 4/587* (2013.01); *H01M 4/136* (2013.01); *H01M 4/366* (2013.01);
(Continued)

(58) Field of Classification Search
CPC ........... H01M 4/38; H01M 4/36; H01M 4/625
See application file for complete search history.

(56) References Cited

U.S. PATENT DOCUMENTS

2011/0052998 A1 3/2011 Liang et al.
2018/0159121 A1 6/2018 Guo et al.
(Continued)

FOREIGN PATENT DOCUMENTS

CN 103840125 A 6/2014
CN 105742580 A 7/2016
(Continued)

OTHER PUBLICATIONS

Guo et al., Sulfur-Carbon Composite Comprising Micro-Porous Carbon Nanosheets for Lithium-Sulfur Batteries and Process for Preparing the Same, Oct. 2020, See the Abstract, (Year: 2020).*
(Continued)

*Primary Examiner* — Tiffany Legette
*Assistant Examiner* — Monique M Wills
(74) *Attorney, Agent, or Firm* — Bryan Cave Leighton Paisner LLP

(57) ABSTRACT

A positive electrode for a lithium-sulfur battery is provided. The positive electrode includes a positive electrode active material comprising a first and second sulfur-carbon composites respectively comprising a first and a second carbonaceous materials having a different specific surface area and pore volume from each other, and provides reduced initial irreversible capacity and improved output characteristics and life characteristics of a secondary battery.

10 Claims, 1 Drawing Sheet

(51) Int. Cl.
*H01M 4/36* (2006.01)
*H01M 4/587* (2010.01)
*H01M 10/052* (2010.01)
*H01M 4/02* (2006.01)

(52) U.S. Cl.
CPC .... *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 2021/0328209 | A1 | 10/2021 | Lee et al. |
| 2022/0115642 | A1 | 4/2022 | Lee et al. |

FOREIGN PATENT DOCUMENTS

| | | | | | |
|---|---|---|---|---|---|
| CN | 107123801 | A | | 9/2017 | |
| CN | 107658436 | A | | 2/2018 | |
| EP | 3304623 | A1 | | 4/2018 | |
| EP | 3304623 | B1 | * | 10/2020 | .............. H01M 4/38 |
| EP | 3848329 | A1 | | 7/2021 | |
| JP | 2003197196 | A | | 7/2003 | |
| JP | 2018039685 | A | | 3/2018 | |
| JP | 2021066618 | A | | 4/2021 | |
| JP | 2021136126 | A | | 9/2021 | |
| JP | 2021141168 | A | | 9/2021 | |
| KR | 10-2018-0042157 | A | | 4/2018 | |
| KR | 10-2019-0061215 | A | | 6/2019 | |
| KR | 10-2019-0068066 | A | | 6/2019 | |
| KR | 20190061215 | A | * | 6/2019 | .......... H01M 10/052 |
| KR | 20190068066 | A | | 6/2019 | |
| KR | 10-2020-0089474 | A | | 7/2020 | |
| KR | 10-2020-0132248 | A | | 11/2020 | |
| KR | 10-2021-0032637 | A | | 3/2021 | |
| KR | 10-2269341 | B1 | | 6/2021 | |
| WO | 2020096253 | A1 | | 5/2020 | |

OTHER PUBLICATIONS

Jeong et al, Sulfur-Carbon Tube Composite Originated From Biomass And The Fabrication Method Thereof, Jun. 2019 See the Abstract, (Year: 2019).*

Xu, et al. (2013), Mesoporous Carbon-Carbon Nanotube-Sulfur Composite Microspheres for High-Areal-Capacity Lithium-Sulfur Battery Cathodes, ACS Appl. Mater. Interfaces, vol. 5., pp. 11355-11362.

* cited by examiner

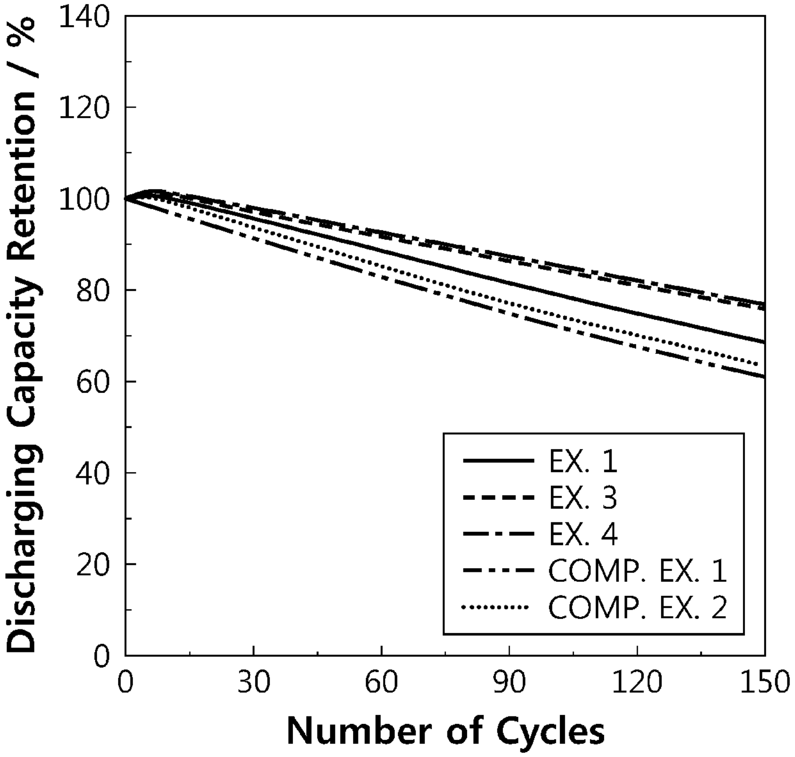
Discharging Capacity Retention / %
140
120
100
80
60
40
20
0
0
30
60
90
120
150
Number of Cycles
EX. 1
EX. 3
EX. 4
COMP. EX. 1
COMP. EX. 2

POSITIVE ELECTRODE INCLUDING SULFUR-CARBON COMPOSITE AND LITHIUM-ION SECONDARY BATTERY INCLUDING THE SAME

CROSS-REFERENCE TO RELATED APPLICATION(S)

This application is a National Stage Application of International Application No. PCT/KR2022/016849, filed on Oct. 31, 2022, which claims priority to Korean Patent Application No. 10-2021-0147384 filed on Oct. 29, 2021, the disclosures of which are incorporated herein by reference in their entireties.

FIELD OF DISCLOSURE

The present disclosure relates to a lithium-ion secondary battery having high energy density and inhibited from elution of polysulfide, and a positive electrode for the battery.

BACKGROUND

A lithium-sulfur (Li—S) battery using a conventional catholyte system is problematic in that it depends on a catholyte type reaction through the formation of polysulfide as an intermediate product in the form of $Li_2S_x$, and thus cannot utilize a high theoretical discharge capacity (1675 mAh/g) of sulfur (S) sufficiently and causes degradation of battery life characteristics due to the elution of polysulfide.

Recently, a sparingly solvating electrolyte (SSE) system inhibiting the elution of polysulfide has been developed. Thus, it has been determined that application of a carbonaceous material having a high specific surface area of larger than 1,500 $m^2/g$ allows a utilization of 90% or more based on the theoretical capacity. However, there is a need for improving low life characteristics and output characteristics.

Under these circumstances, there is a need for an electrolyte and positive electrode active material system capable of being operated even at 4.0 $mAh/cm^2$ or more and a porosity of 60 vol % or less in order to realize a battery system having a high energy density of 400 Wh/kg or more and 600 Wh/L or more.

SUMMARY

The present disclosure is designed to solve the problems of the related art, and therefore the present disclosure is directed to providing a positive electrode active material for a battery system having a high energy density of 400 Wh/kg or more and 600 Wh/L or more.

The present disclosure is also directed to providing a lithium-ion secondary battery including the positive electrode active material.

Also, it will be easily understood that these and other objects and advantages of the present disclosure may be realized by the means shown in the appended claims and combinations thereof.

According to the first embodiment of the present disclosure, there is provided a positive electrode for a lithium-sulfur battery, the positive electrode comprising a positive electrode active material including a mixture of a first sulfur-carbon composite and a second sulfur-carbon composite, wherein the first sulfur-carbon composite includes a first porous carbonaceous material and sulfur, and the first carbonaceous material has a BET specific surface area of 1,600 $m^2/g$ or more and 80 vol % or more of pores having a diameter of less than 3 nm based on 100 vol % of the total pores, and the second sulfur-carbon composite includes a second porous carbonaceous material and sulfur, and the second carbonaceous material has a BET specific surface area of equal to or larger than 1,000 $m^2/g$ and less than 1,600 $m^2/g$ and 50 vol % or less of pores having a diameter of less than 3 nm based on 100 vol % of the total pores.

According to the second embodiment of the present disclosure, there is provided the positive electrode for a lithium-sulfur battery as defined in the first embodiment, wherein the first carbonaceous material has a BET specific surface area of 2,000 $m^2/g$ or more.

According to the third embodiment of the present disclosure, there is provided the positive electrode for a lithium-sulfur battery as defined in any one of the first or the second embodiment, wherein the first carbonaceous material includes activated carbon.

According to the fourth embodiment of the present disclosure, there is provided the positive electrode for a lithium-sulfur battery as defined in any one of the first to the third embodiments, wherein the first carbonaceous material includes activated carbon in an amount of 95 wt % or more based on 100 wt % or the first carbonaceous material.

According to the fifth embodiment of the present disclosure, there is provided the positive electrode for a lithium-sulfur battery as defined in any one of the first to the fourth embodiments, wherein the first sulfur-carbon composite is present in an amount of less than 90 wt % based on 100 wt % of the first sulfur-carbon composite and the second sulfur-carbon composite.

According to the sixth embodiment of the present disclosure, there is provided the positive electrode for a lithium-sulfur battery as defined in any one of the first to the fifth embodiments, wherein the first sulfur-carbon composite has an SCP value of larger than 0.65 and less than 1, and the second sulfur-carbon composite has an SCP value of larger than 0.55 and less than 0.85, as defined by the following Formula 1:

$$\text{SCP}=\text{Sulfur content ratio }(A)\div\text{Pore volume ratio of carbonaceous material }(B) \quad \text{[Formula 1]}$$

In Formula 1, A represents a ratio of a weight of sulfur based on a weight of the carbon-sulfur composite, and B represents a ratio of pore volume in the carbonaceous material based on the apparent volume of the carbonaceous material.

According to the seventh embodiment of the present disclosure, there is provided the positive electrode for a lithium-sulfur battery as defined in any one of the first to the sixth embodiments, wherein the positive electrode active material includes the first sulfur-carbon composite and the second sulfur-carbon composite in an amount of 70 wt % or more based on 100 wt % of the positive electrode active material.

According to the eighth embodiment of the present disclosure, there is provided the positive electrode for a lithium-sulfur battery as defined in any one of the first to the seventh embodiments, wherein each of the first sulfur-carbon composite and the second sulfur-carbon composite is one or more of a composite formed through simple mixing of sulfur with the carbonaceous material, a coated composite having a core-shell structure, or a composite including sulfur packed in the internal pores of the carbonaceous material.

According to the ninth embodiment of the present disclosure, there is provided the positive electrode for a lithium-sulfur battery as defined in any one of the first to the eighth embodiments, wherein the positive electrode active material further includes a binder resin and a conductive material.

According to the tenth embodiment of the present disclosure, there is provided a lithium-sulfur battery including a positive electrode, a negative electrode, a separator between the positive electrode and the negative electrode, and an electrolyte, wherein the electrolyte includes one or more selected from a cyclic ether, a linear ether and a fluorinated ether, and the positive electrode is the same as defined in any one of the first to the ninth embodiments.

The lithium-sulfur battery using the sulfur-carbon composite according to the present disclosure shows a reduced initial irreversible capacity and provides improved output characteristics and life characteristics.

DESCRIPTION OF DRAWINGS

FIG. 1 is a graph illustrating the result of capacity retention of the battery according to each of Examples and Comparative Examples.

DETAILED DESCRIPTION

Hereinafter, preferred embodiments of the present disclosure will be described in detail.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Throughout the specification, the expression 'a part includes or has an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

As used herein, 'specific surface area' is determined by the BET method, and particularly, may be calculated from the nitrogen gas adsorption under a liquid nitrogen temperature (77K) by using BELSORP-mino II available from BEL Japan Co.

The term 'polysulfide' used herein has a concept covering both 'polysulfide ion ($S_x^{2-}$, x=8, 6, 4, 2) and 'lithium polysulfide ($Li_2S_x$ or $LiS_x^-$, wherein x=8, 6, 4, 2)'.

As used herein, the term 'composite' means a material including a combination of two or more materials and realizing more effective functions, while forming physically/chemically different phases.

As used herein, the term 'porosity' means a ratio of volume occupied by pores based on the total volume of a structure, is expressed by the unit of %, and may be used interchangeably with the terms, such as pore ratio, porous degree, or the like.

According to the present disclosure, 'particle diameter $D_{50}$' means a particle size on the basis of 50% in the volume cumulative particle size distribution of a particle powder to be analyzed. The particle diameter, $D_{50}$, may be determined by using a laser diffraction method. For example, $D_{50}$ may be determined by dispersing a powder to be analyzed in a dispersion medium, introducing the resultant dispersion to a commercially available laser diffraction particle size analyzer (e.g., Microtrac S3500), irradiating ultrasonic waves of about 28 kHz at an output of 60 W to obtain a graph of volume cumulative particle size distribution, and then determining the particle size corresponding to 50% of the cumulative volume.

In addition, the size and thickness of each element shown in the drawings are depicted optionally for the purpose of convenience of description, and thus the scope of the present disclosure is not limited thereto. In the accompanying drawings, different layers and regions are shown with enlargement of thickness so that they may be identified clearly. Further, thicknesses of some layers and regions in the drawings may be exaggerated for the purpose of clearer description.

Further, throughout the specification, the expression 'a part includes an element' does not preclude the presence of any additional elements but means that the part may further include the other elements, unless otherwise stated.

The present disclosure relates to a positive electrode active material for an electrochemical device and a positive electrode including the same. According to the present disclosure, the electrochemical device includes any device which carries out electrochemical reaction, and particular examples thereof include all types of primary batteries, secondary batteries, fuel cells, solar cells or capacitors, such as super capacitor devices. Particularly, the electrochemical device may be a secondary battery, and the secondary battery may be a lithium-ion secondary battery. For example, the lithium-ion secondary battery may be a lithium-metal battery, a lithium-sulfur battery, an all-solid-state battery, a lithium polymer battery, or the like, a lithium-sulfur battery being preferred.

The positive electrode active material according to the present disclosure includes a mixture of a first sulfur-carbon composite and a second sulfur-carbon composite, wherein each composite includes a porous carbonaceous material having a different BET specific surface area and pore distribution.

Lithium-sulfur batteries have high discharge capacity and theoretical energy density among various secondary batteries, as well as abundant reserves and low price of sulfur used as a positive electrode active material can reduce the manufacturing cost of the batteries. In addition, such lithium-sulfur batteries have been spotlighted as next-generation secondary batteries by virtue of their eco-friendly advantages.

Since sulfur as a positive electrode active material in a lithium-sulfur battery is a non-conductor, a sulfur-carbon composite formed into a composite with a conductive carbonaceous material has been used generally in order to supplement low electrical conductivity.

However, in the case of a conventional sulfur-carbon composite, lithium polysulfide formed during the electrochemical oxidation/reduction of a lithium-sulfur battery is eluted to an electrolyte to cause a loss of sulfur, resulting in a rapid drop in content of sulfur participating in the electrochemical reaction. As a result, it is not possible to realize the theoretical discharge capacity and theoretical energy density totally in the actual operation. In addition, sulfur undergoes volumetric swelling to about 80%, while being converted into lithium sulfide ($Li_2S$) upon the complete discharge, and thus the pore volume of a positive electrode is reduced, thereby making it difficult to be in contact with an electrolyte. Moreover, lithium polysulfide cannot be reduced completely due to a shuttle phenomenon of reciprocating between a positive electrode and a negative electrode, but undergoes a circular reaction of consuming electrons to cause degradation of charge/discharge efficiency and life undesirably.

To solve this, there have been suggested some methods according to the related art. For example, such methods include increasing the loading amount of sulfur, using a different type of carbonaceous material or mixing process, introducing a coating layer for inhibiting elution of lithium polysulfide, or the like. However, such methods are disadvantageous in that they cannot effectively improve the performance of a lithium-sulfur battery, may cause a severe problem in the stability of the battery, or are not efficient in terms of processes.

Under these circumstances, the present disclosure provides a positive electrode including a sulfur-carbon composite containing two types of carbonaceous materials having a different specific surface area in order to improve the electrochemical reactivity, stability and electrical conductivity of a sulfur-carbon composite and to ensure an effect of improving the capacity and life characteristics of a lithium-sulfur battery including the sulfur-carbon composite.

Particularly, the positive electrode active material according to the present disclosure includes a positive electrode active material including a mixture of a first sulfur-carbon composite and a second sulfur-carbon composite, wherein the first sulfur-carbon composite includes a first porous carbonaceous material and sulfur, and the first carbonaceous material has a BET specific surface area of 1,600 $m^2/g$ or more and 80 vol % or more of pores having a diameter of less than 3 nm based on 100 vol % of the total pores. According to an embodiment of the present disclosure, the first carbonaceous material may have a BET specific surface area of 2,000 $m^2/g$ or more, or 2,500 $m^2/g$ or more.

In addition, the second sulfur-carbon composite includes a second porous carbonaceous material and sulfur, wherein the second carbonaceous material has a BET specific surface area of equal to or larger than 1,000 $m^2/g$ and less than 1,600 $m^2/g$ and a ratio of pores having a diameter of less than 3 nm of 50 vol % or less based on 100 vol % of the total pores.

The positive electrode active material includes a mixture of the first sulfur-carbon composite with the second sulfur-carbon composite. Particularly, the positive electrode active material may include the first sulfur-carbon composite and the second sulfur-carbon composite mixed homogeneously in a single positive electrode active material layer. Particularly, the first sulfur-carbon composite and the second sulfur-carbon composite may have a mixed phase throughout the thickness of the positive electrode active material based on the thickness direction.

The first and the second carbonaceous materials function as a support providing a framework with which sulfur can be fixed uniformly and stably, and supplement the low electrical conductivity of sulfur to facilitate electrochemical reactions.

Particularly, since the sulfur-carbon composite according to the present disclosure includes the first carbonaceous material and the second carbonaceous material as materials functioning as a support of sulfur, and the first carbonaceous material and the second carbonaceous materials have a different specific surface, it has a structure capable of enhancing the utilization of sulfur during an electrochemical reaction.

According to the related art, use of a carbonaceous material having a high specific surface area has been suggested in order to improve the reactivity of sulfur. However, when using a single carbonaceous material having a high specific surface area, it cannot be in contact with an electrolyte sufficiently, and thus it was difficult to realize a high-capacity lithium-sulfur battery.

Under these circumstances, according to the present disclosure, when the first carbonaceous material having a high specific surface area is used as one of the carbonaceous materials, it is possible to disperse sulfur homogeneously inside of and on the external surface of the first carbonaceous material, thereby enhancing the electrochemical reactivity of sulfur. In addition, when the second carbonaceous material having a low specific surface area is used as the other of the carbonaceous materials, it is possible to allow easy introduction/discharge of an electrolyte into/from the composite, thereby enhancing the contact area between sulfur and the electrolyte and facilitating migration of electrons and lithium ions toward a positive electrode. As a result, it is possible to realize electrochemical characteristics, including high capacity.

Particularly, according to the present disclosure, two types of carbonaceous materials having a different specific surface area are used as carbonaceous materials functioning as a support of sulfur, and the content of sulfur is controlled suitably depending on the specific surface area. In this manner, the sulfur-carbon composite has a structure capable of improving the utilization of sulfur during electrochemical oxidation/reduction, and thus the electrochemical reactivity, stability and electrical conductivity of the sulfur-carbon composite are improved, resulting in improvement of the capacity and life characteristics of a lithium-sulfur battery. In addition, even when a loss of sulfur or a change in volume occurs during charge/discharge, it is possible to realize optimized charge/discharge performance.

In the sulfur-carbon composite according to the present disclosure, the carbonaceous materials used as a support of sulfur include the first carbonaceous material and the second carbonaceous material and may be prepared generally by carbonizing various carbonaceous precursors.

Each of the first carbonaceous material and the second carbonaceous material may include a plurality of irregular pores on the surface and inside thereof.

The first carbonaceous material has a BET specific surface area of 1,600 $m^2/g$ or more and 80 vol % or more of pores having a diameter of less than 3 nm.

Meanwhile, the second carbonaceous material has a BET specific surface area of equal to or larger than 1,000 $m^2/g$ and less than 1,600 $m^2/g$ and a ratio of pores having a diameter of less than 3 nm of 50 vol % or less.

Each of the first carbonaceous material and the second carbonaceous material may have a spherical, rod-like, needle-like, sheet-like, tubular or bulky shape, and any carbonaceous material may be used with no particular limitation, as long as it is one used conventionally for a lithium-sulfur secondary battery.

Each of the first carbonaceous material and the second carbonaceous material may be any carbonaceous material having porous property and conductivity, as long as it is one used conventionally in the art. Particularly, each carbonaceous material may include at least one selected from the group consisting of graphite; graphene; carbon black, such as denka black, acetylene black, ketjen black, channel black, furnace black, lamp black, thermal black, or the like; carbon nanotubes (CNTs), such as single-walled carbon nanotubes (SWCNTs), multi-walled carbon nanotubes (MWCNTs), or the like; carbon fibers, such as graphite nanofibers (GNFs), carbon nanofibers (CNFs), activated carbon fibers (ACFs), or the like; graphite, such as natural graphite, artificial graphite, expanded graphite, or the like; carbon nanoribbons; carbon nanobelts, carbon nanorods and activated carbon.

According to the present disclosure, the first carbonaceous material may include activated carbon, preferably. According to an embodiment of the present disclosure, the first carbonaceous material may include 95 wt % or more, preferably 99 wt % or more, of activated carbon based on 100 wt % of the first carbonaceous material. For example, the first carbonaceous may include activated carbon alone. Meanwhile, although there is no particular limitation, the first carbonaceous material may have a particle diameter ($D_{50}$) of primary particles of 1-10 μm.

According to an embodiment of the present disclosure, the second carbonaceous material may be any carbonaceous material having porous property and conductivity, as long as it is one used conventionally in the art. Particular examples of the second carbonaceous material may include the above-listed carbonaceous materials.

Meanwhile, although there is no particular limitation, the second carbonaceous material may have a particle diameter ($D_{50}$) of primary particles of 1-10 μm.

As descried above, the first carbonaceous material has a larger specific surface area as compared to the second carbonaceous material. Particularly, the specific surface area of the first carbonaceous material may be twice or more, preferably 2-100 times, and more preferably 5-50 times of the specific surface area of the second carbonaceous material. When the difference in specific surface area between the first carbonaceous material and the second carbonaceous material dose not satisfy the above-defined range, problems may arise in forming a structure capable of increasing the utilization of sulfur in the electrode.

According to the present disclosure, each of the first sulfur-carbon composite and the second sulfur-carbon composite independently includes sulfur.

Since sulfur itself has no electrical conductivity, it is used after being formed into a composite with each of the above-mentioned first and second carbonaceous materials.

Herein, sulfur may be at least one selected from the group consisting of inorganic sulfur ($S_8$), $Li_2S_n$, ($n \geq 1$), 2,5-dimercapto-1,3,4-thiadiazole, disulfide compound, such as 1,3,5-trithiocyanuic acid, organic sulfur compound and carbon-sulfur polymer ($(C_2S_x)_n$, $x=2.5$-50, $n \geq 2$). Preferably, sulfur may include inorganic sulfur ($S_8$).

According to an embodiment of the present disclosure, the positive electrode active material may include the first sulfur-carbon composite and the second sulfur-carbon composite in an amount of 50 wt % or more, 70 wt % or more, 90 wt % or more, or 95 wt % or more. According to an embodiment of the present disclosure, the positive electrode active material may include the first sulfur-carbon composite and the second sulfur-carbon composite alone.

According to the present disclosure, the content of sulfur in each of the first sulfur-carbon composite and the second sulfur-carbon composite is represented by an SCP value according to the following Formula 1:

$$\text{SCP}=\text{Sulfur content ratio }(A)\div\text{Pore volume ratio of carbonaceous material }(B) \quad \text{[Formula 1]}$$

In Formula 1, A represents a ratio of the weight of sulfur based on the weight of the carbon-sulfur composite (weight of sulfur/weight of sulfur-carbon composite), and B represents a ratio of pore volume in the carbonaceous material (volume of pores in carbonaceous material/apparent volume) based on the total volume (apparent volume, volume of carbon alone+volume of pores) of the carbonaceous material. In addition, there is no unit of SCP.

According to an embodiment of the present disclosure, carbon has a true density of 2.0 g/cm$^3$ (except the pore volume in the carbonaceous material), and has a unit volume of 0.5 cm 3/g.

According to the present disclosure, the first sulfur-carbon composite has an SCP value of larger than 0.65 and less than 1. In addition, the second sulfur-carbon composite has an SCP value of larger than 0.55 and less than 0.85.

Herein, the SCP value means a content of sulfur that may be used reversibly in the carbonaceous material having a specific pore structure.

When the SCP value of each of the first and the second sulfur-carbon composites satisfies the above-defined range, sulfur may be used effectively and efficiently.

When the content of sulfur is larger than the above-defined ranges, sulfur or sulfur compound that is not bound to the carbonaceous material may be aggregated or eluted again toward the surface of the porous carbonaceous material, and thus may hardly accept electrons and may not participate in the electrochemical reaction, resulting in a loss of the capacity of a battery.

Meanwhile, according to the present disclosure, the first sulfur-carbon composite is present in an amount of less than 90 wt %, preferably 85 wt % or less, based on 100 wt % of the first sulfur-carbon composite and the second sulfur-carbon composite. In addition, the second sulfur-carbon composite is present in an amount of larger than 10 wt %, preferably 15 wt % or more, based on 100 wt % of the first sulfur-carbon composite and the second sulfur-carbon composite. According to a particular embodiment, the first sulfur-carbon composite and the second sulfur-carbon composite may be present in the positive electrode active material at a weight ratio of 8:2-2:8, or 7:3-3:7. When the ratio of the first sulfur-carbon composite to the second sulfur-carbon composite does not fall within the above-defined range, the sulfur loading amount may not be improved sufficiently, and the formation of a structure for increasing the utilization of sulfur in the electrode may be affected adversely. Therefore, it is preferred to determine an adequate content within the above-defined weight ratio.

In each of the first sulfur-carbon composite and the second sulfur-carbon composite according to the present disclosure, sulfur may be positioned inside of the pores of the carbonaceous material and at least one outer surface of the carbonaceous material, wherein sulfur may be present in a region corresponding to less than 100%, preferably 1-95%, more preferably 60-90%, of the whole of the inner part and outer surface of the carbonaceous material. When sulfur is present on the surface of the carbonaceous material within the above-defined range, it is possible to realize the highest effect in terms of electron transfer area and wettability with an electrolyte. Particularly, within the above-defined range, the surface of the carbonaceous material is impregnated uniformly and thinly with sulfur. Therefore, it is possible to increase the electron transfer contact area during charge/discharge cycles. When sulfur is positioned on the whole surface of the carbonaceous material at a ratio of 100%, the carbonaceous material is totally covered with sulfur to cause degradation of wettability with an electrolyte and contactability with a conductive material contained in an electrode, and thus cannot accept electrons and cannot participate in the reaction.

Each of the first sulfur-carbon composite and the second sulfur-carbon composite may be formed through simple mixing of sulfur with the carbonaceous material, or may be a coated composite having a core-shell structure or a supported composite. The coated composite having a core-shell structure is formed by coating one of sulfur and the carbonaceous material with the other of them. For example, the surface of the carbonaceous material may be surrounded with sulfur, or vice versa. In addition, the supported composite may be formed by packing sulfur inside of the carbonaceous material or in the pores of the carbonaceous material. According to the present disclosure, any type of the sulfur-carbon composite may be used with no particular limitation, as long as it satisfies the above-defined weight ratio of a sulfur-based compound to a carbonaceous material.

In still another aspect of the present disclosure, there is provided a method for preparing a sulfur-carbon composite.

The method for preparing a sulfur-carbon composite according to the present disclosure is not particularly limited and may be any method generally known to those skilled in the art.

For example, the method for preparing a sulfur-carbon composite according to the present disclosure includes the steps of: (a) mixing a first carbonaceous material with sulfur and forming the resultant mixture into a composite, thereby providing a first sulfur-carbon composite; (b) mixing a second carbonaceous material with sulfur and forming the resultant mixture into a composite, thereby providing a second sulfur-carbon composite; and (c) mixing the first sulfur-carbon composite obtained from step (a) with the second sulfur-carbon composite obtained from step (b).

Step (a) is a step of mixing a first carbonaceous material with sulfur and forming the resultant mixture into a composite, and may be carried out by using a conventional process known to those skilled in the art.

Herein, the first carbonaceous material and sulfur used in step (a) are the same as described above with reference to the sulfur-carbon composite.

The mixing in step (a) is intended to increase the miscibility of the above-mentioned ingredients, and may be carried out by using an agitator, such as a mechanical milling device, used conventionally in the art. Herein, the mixing time and rate may be controlled selectively according to the content and condition of the ingredients.

The method for forming a composite is not particularly limited, and any method used conventionally in the art may be used. For example, methods used conventionally in the art, such as a dry composite formation or a wet composite formation (e.g., spray coating), may be used. For example, the mixture of sulfur with the first carbonaceous material obtained after the mixing is pulverized through ball milling and is allowed to stand in an oven at 120-160° C. for 20 minutes to 1 hour so that molten sulfur may be coated uniformly inside and on the external surface of the first carbonaceous material.

Then, step (b) is a step of mixing a second carbonaceous material with sulfur and forming the resultant mixture into a composite, and may be carried out by using a conventional process known to those skilled in the art.

The methods for mixing and forming a composite in step (b) are the same as described above with reference to step (a).

The second carbonaceous material and sulfur used in step (b) are the same as described above with reference to the sulfur-carbon composite. Then, step (c) of mixing the first sulfur-carbon composite obtained from step (a) with the second sulfur-carbon composite obtained from step (b) is carried out. The mixing is intended to increase the miscibility between the first sulfur-carbon composite and the second sulfur-carbon composite obtained from the preceding steps, and may be carried out by using an agitator used conventionally in the art. Herein, the mixing time and rate may be controlled selectively according to the content and condition of the ingredients.

Since the sulfur-carbon composite obtained by the above-described method includes two types of carbonaceous materials having a different specific surface area as a support of sulfur, it is possible to improve not only the electrochemical reactivity of sulfur but also the accessibility and contactability of an electrolyte, and thus to improve the capacity and life characteristics of a battery.

In still another aspect of the present disclosure, there is provided a positive electrode including the sulfur-carbon composite. The positive electrode includes: a positive electrode current collector; and a positive electrode active material layer formed on at least one surface of the positive electrode current collector, wherein the positive electrode active material layer includes a positive electrode active material, a conductive material and a binder resin. The positive electrode active material layer may include the positive electrode active material in an amount of 70 wt % or more, preferably 85 wt % or more, based on 100 wt % of the positive electrode active material layer.

According to the present disclosure, the positive electrode active material includes the above-described sulfur-carbon composite. According to an embodiment of the present disclosure, the positive electrode active material may include the first sulfur-carbon composite and the second sulfur-carbon composite in an amount of 70 wt % or more, preferably 80 wt % or more, and more preferably 90 wt % or more, based on 100 wt % of the positive electrode active material. According to an embodiment of the present disclosure, the positive electrode active material may include the first sulfur-carbon composite and the second sulfur-carbon composite alone. In addition, the positive electrode active material may further include at least one additive selected from transition metal elements, Group IIIA elements, Group IVA elements, sulfur compounds of those elements and alloys of sulfur with those elements, besides the sulfur-carbon composite.

According to an embodiment of the present disclosure, the positive electrode active material layer formed on at least one surface of the positive electrode current collector may include a mixture of the first sulfur-carbon composite with the second sulfur-carbon composite, wherein the first sulfur-carbon composite and the second sulfur-carbon composite may be mixed homogeneously in a single layer. In addition, when the mixture of the first sulfur-carbon composite with the second sulfur-carbon composite is formed on at least one surface of the positive electrode current collector, they may have a concentration gradient. For example, in the positive electrode active material layer, the first sulfur-carbon composite may have a concentration increasing in the thickness direction of the positive electrode current collector from the positive electrode current collector, while the second sulfur-carbon composite may have a concentration decreasing in the thickness direction of the positive electrode current collector from the positive electrode current collector. On the other hand, the first sulfur-carbon composite may have a concentration decreasing in the thickness direction of the positive electrode current collector from the positive electrode current collector, while the second sulfur-carbon composite may have a concentration increasing in the thickness direction of the positive electrode current collector from the positive electrode current collector. However, even when the first sulfur-carbon composite and the second sulfur-carbon composite are formed with a concentration gradient in the positive electrode active material layer, it is preferred that they have a homogeneous mixed phase while not forming individual layers.

According to an embodiment of the present disclosure, the positive electrode active material layer may include a lithium transition metal composite oxide represented by the following Chemical Formula 1:

$$Li_aNi_bCo_cM^1_dM^2_eO_2 \quad \text{[Chemical Formula 1]}$$

wherein $M^1$ represents Mn, Al or a combination thereof, and preferably may be Mn, or Mn and Al; and $M^2$ represents at least one selected from the group consisting of Zr, W, Y, Ba, Ca, Ti, Mg, Ta and Nb, preferably may be at least one selected from the group consisting of Zr, Y, Mg and Ti, and more preferably may be Zr, Y or a combination thereof. The element, $M^2$, is not essentially contained, but may function to accelerate grain growth during firing or to improve the crystal structure stability, when being contained in a suitable amount.

Meanwhile, the positive electrode current collector may include various positive electrode current collectors used in the art. Particular examples of the positive electrode current collector include stainless steel, aluminum, nickel, titanium, baked carbon, or aluminum or stainless steel surface-treated with carbon, nickel, titanium, silver, or the like. In general, the positive electrode current collector may have a thickness of 3-500 μm. In addition, the positive electrode current collector may have fine surface irregularities formed on the surface thereof to increase the adhesion of a positive electrode active material. For example, the positive electrode current collector may have various shapes, such as a film, a sheet, a foil, a net, a porous body, a foam or non-woven web body, or the like.

The conductive material is an ingredient for imparting conductivity to an electrode, and any material may be used with no particular limitation, as long as it has electron conductivity, while not causing any chemical change in the corresponding battery. Particular examples of the conductive material include: graphite, such as natural graphite or artificial graphite; carbonaceous material, such as carbon black, acetylene black, ketjen black, channel black, furnace black, lamp black, thermal black, carbon fibers, carbon nanotubes, or the like; metal powder or metal fibers, such as copper, nickel, aluminum, silver, or the like; conductive whisker, such as zinc oxide or potassium titanate; conductive metal oxide, such as titanium oxide; and conductive polymers, such as polyphenylene derivatives, and such conductive materials may be used alone or in combination. In general, the conductive material may be used in an amount of 1-30 wt %, preferably 1-20 wt %, and more preferably 1-10 wt %, based on the total weight of the positive electrode active material layer.

The binder is an ingredient functioning to improve the adhesion among the positive electrode active material particles and the adhesion between the positive electrode active material and the positive electrode current collector. Particular examples of the binder include polyvinylidene fluoride (PVDF), polyvinylidene fluoride-co-hexafluoropropylene (PVDF-co-HFP), polyvinyl alcohol, polyacrylonitrile, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer rubber (EPDM rubber), sulfonated EPDM, styrene-butadiene rubber (SBR), fluororubber, various copolymers, or the like, and such binders may be used alone or in combination. The binder may be used in an amount of 1-30 wt %, preferably 1-20 wt %, and more preferably 1-10 wt %, based on the total weight of the positive electrode active material layer.

The positive electrode may be obtained by a conventional method known to those skilled in the art.

According to an embodiment of the present disclosure, the positive electrode may be obtained as follows. First, the binder is dissolved in a solvent for preparing a slurry, and then the conductive material is dispersed therein. The solvent for preparing a slurry may be one capable of dispersing the positive electrode active material, the binder and the conductive material homogeneously and evaporating with ease, preferably. Typical examples of the solvent include acetonitrile, methanol, ethanol, tetrahydrofuran, water, isopropyl alcohol, or the like. Then, the positive electrode active material is dispersed homogeneously in the solvent containing the conductive material dispersed therein, optionally together with additives, thereby preparing a positive electrode slurry. The content of each of the solvent, positive electrode active material or optionally used additives is not significant in the present disclosure, and such ingredients may be used to provide a viscosity sufficient to facilitate coating of the slurry.

The prepared slurry is applied to a current collector and vacuum dried to form a positive electrode. The slurry may be coated on the current collector to an adequate thickness depending on the slurry viscosity and the thickness of a positive electrode to be formed.

The slurry may be coated by using a method generally known to those skilled in the art. For example, the positive electrode active material slurry is distributed on the top surface of one side of the positive electrode current collector and may be dispersed uniformly by using a doctor blade, or the like. In addition to this, the positive electrode active material slurry may be coated by using a die casting, comma coating, screen printing process, or the like.

The slurry may be dried in a vacuum oven at 50-200° C. for 1 day or less, but is not limited thereto.

In still another aspect of the present disclosure, there is provided a lithium-sulfur battery including an electrode assembly that includes the positive electrode including the above-described sulfur-carbon composite, and an electrolyte. The electrode assembly includes a positive electrode, a negative electrode and a separator between the positive electrode and the negative electrode.

For example, the electrode assembly may have a stacked or stacked/folded structure formed by stacking a negative electrode and a positive electrode with a separator disposed therebetween, or may have a jelly-roll structure formed by winding the stack. In addition, when forming a jelly-roll structure, a separator may be further disposed at the outside to prevent the negative electrode and the positive electrode from being in contact with each other.

The negative electrode may include a negative electrode current collector; and a negative electrode active material layer formed on at least one surface of the negative electrode current collector, wherein the negative electrode active material layer includes a negative electrode active material, a conductive material and a binder.

Hereinafter, the negative electrode will be explained in more detail.

The negative electrode may have a structure including a negative electrode active material layer formed on one surface or both surfaces of an elongated sheet-like negative electrode current collector, wherein the negative electrode active material layer may include a negative electrode active material, a conductive material and a binder.

Particularly, the negative electrode may be obtained by applying a negative electrode slurry, prepared by dispersing a negative electrode active material, a conductive material and a binder in a solvent, such as dimethyl sulfoxide (DMSO), isopropyl alcohol, N-methyl pyrrolidone (NMP), acetone or water, to one surface or both surfaces of a negative electrode current collector, and removing the solvent of the negative electrode slurry through a drying process, followed by pressing. Meanwhile, when applying the negative electrode slurry, the negative electrode slurry may not be applied to a partial region of the negative electrode current collector, for example one end of the negative electrode current collector, to obtain a negative electrode including a non-coated portion.

The negative electrode active material may include a material capable of reversible lithium-ion (Lit) intercalation/deintercalation, a material capable of reacting with lithium ions to form a lithiated compound reversibly, lithium metal or lithium alloy. For example, the material capable of reversible lithium-ion intercalation/deintercalation may include crystalline carbon, amorphous carbon or a mixture thereof, and particular examples thereof may include artificial graphite, natural graphite, graphitized carbon fibers, amorphous carbon, soft carbon, hard carbon, or the like, but are not limited thereto. Particular examples of the material capable of reacting with lithium ions reversibly to form a lithiated compound may include tin oxide, titanium nitrate or a silicon-based compound. Particular example of the lithium alloy may include alloys of lithium (Li) with a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn). Preferably, the negative electrode active material may be lithium metal, particularly lithium metal foil or lithium metal powder. The silicon-based negative electrode active material may include Si, Si-Me alloy (wherein Me is at least one selected from the group consisting of Al, Sn, Mg, Cu, Fe, Pb, Zn, Mn, Cr, Ti and Ni), $SiO_y$ (wherein $0<y<2$), Si—C composite or a combination thereof, preferably $SiO_y$ (wherein $0<y<2$). Since the silicon-based negative electrode active material has a high theoretical capacity, use of such a silicon-based negative electrode active material can improve capacity characteristics.

The negative electrode current collector may include a negative electrode current collector used generally in the art. Particular examples of the negative electrode current collector include copper, stainless steel, aluminum, nickel, titanium, baked carbon, copper or stainless steel surface-treated with carbon, nickel, titanium, silver, aluminum-cadmium alloy, or the like. In general, the negative electrode current collector may have a thickness of 3-500 μm. In addition, similarly to the positive electrode current collector, the negative electrode current collector may have fine surface irregularities formed on the surface thereof to increase the binding force with the negative electrode active material. For example, the negative electrode current collector may have various shapes, such as a film, a sheet, a foil, a net, a porous body, a foam or non-woven web body, or the like.

The conductive material is an ingredient for imparting conductivity to the negative electrode, and any material may be used with no particular limitation, as long as it has electron conductivity, while not causing any chemical change in the corresponding battery. Particular examples of the conductive material include: graphite, such as natural graphite or artificial graphite; carbonaceous material, such as carbon black, acetylene black, ketjen black, channel black, furnace black, lamp black, thermal black, carbon fibers, carbon nanotubes, or the like; metal powder or metal fibers, such as copper, nickel, aluminum, silver, or the like; conductive whisker, such as zinc oxide or potassium titanate; conductive metal oxide, such as titanium oxide; and conductive polymers, such as polyphenylene derivatives, and such conductive materials may be used alone or in combination. In general, the conductive material may be used in an amount of 1-30 wt %, preferably 1-20 wt %, and more preferably 1-10 wt %, based on the total weight of the negative electrode active material layer.

The binder is an ingredient functioning to improve the adhesion among the negative electrode active material particles and the adhesion between the negative electrode active material and the negative electrode current collector. Particular examples of the binder include polyvinylidene fluoride (PVDF), polyvinylidene fluoride-co-hexafluoropropylene (PVDF-co-HFP), polyvinyl alcohol, polyacrylonitrile, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer rubber (EPDM rubber), sulfonated EPDM, styrene-butadiene rubber (SBR), fluororubber, various copolymers, or the like, and such binders may be used alone or in combination. The binder may be used in an amount of 1-30 wt %, preferably 1-20 wt %, and more preferably 1-10 wt %, based on the total weight of the negative electrode active material layer.

Meanwhile, the electrode assembly further includes a separator, which is disposed in the electrode assembly by interposing it between the negative electrode and the positive electrode. The separator functions to separate the negative electrode and the positive electrode from each other and to provide a lithium-ion channel, and any separator may be used with no particular limitation, as long as it is one used generally for a lithium secondary battery. Particular examples of the separator include a porous polymer film, such as a porous polymer film made of ethylene homopolymer, propylene homopolymer, ethylene/butene copolymer, ethylene/butene copolymer, ethylene/hexene copolymer, ethylene/methacrylate copolymer, or the like, or a laminated structure of two or more layers of such porous polymer films. In addition, a conventional porous non-woven web, such as a non-woven web made of high-melting point glass fibers, polyethylene terephthalate fibers, or the like, may be used. Further, in order to ensure heat resistance or mechanical strength, a coated separator containing a ceramic ingredient or polymer material may be used.

In still another aspect of the present disclosure, there is provided an electrochemical device including the electrode assembly. In the electrochemical device, the electrode assembly is received in a battery casing together with an electrolyte. The battery casing may be any suitable battery casing, such as a pouch type or metallic can type battery casing, used conventionally in the art with no particular limitation.

The electrolyte used according to the present disclosure may include various electrolytes that may be used for a lithium secondary battery. Particular examples of the electrolyte may include, but are not limited to: an organic liquid electrolyte, an inorganic liquid electrolyte, a solid polymer electrolyte, a gel-like polymer electrolyte, a solid inorganic electrolyte, a molten type inorganic electrolyte, or the like.

Particularly, the electrolyte may include an organic solvent and a lithium salt.

The organic solvent is not particularly limited, as long as it can function as a medium through which ions participating in the electrochemical reactions of a battery can be transported. Particular examples of the organic solvent include, but are not limited to: ester-based solvents, such as methyl acetate, ethyl acetate, γ-butyrolactone and ε-caprolactone; ether-based solvents, such as dibutyl ether and tetrahydrofuran; ketone-based solvents, such as cyclohexanone; aromatic hydrocarbon-based solvents, such as benzene and fluorobenzene; carbonate-based solvents, such as dimethyl carbonate (DMC), diethyl carbonate (DEC), ethyl methyl carbonate (EMC), ethylene carbonate (EC) and propylene carbonate (PC); alcohol-based solvents, such as ethyl alcohol and isopropyl alcohol; nitrile-based solvents, such as R—CN (wherein R is a C2-C20 linear, branched or cyclic hydrocarbon group, which may optionally include a double bonded aromatic ring or ether bond); amide-based solvents, such as dimethyl formamide; dioxolane-based solvents, such as 1,3-dioxolan; sulforane-based solvents, or the like.

Meanwhile, according to an embodiment of the present disclosure, the non-aqueous solvent of the electrolyte preferably includes an ether-based solvent with a view to enhancing the charge/discharge performance of a battery. Particular examples of such an ether-based solvent include a cyclic ether (e.g., 1,3-dioxolane, tetrahydrofuran, tetrohydropyran, or the like), a linear ether compound (e.g., 1,2-dimethoxyethane), a low-viscosity fluorinated ether, such as 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, 1H,1H,2'H,3H-decafluorodipropyl ether, pentafluoroethyl 2,2,2-trifluoroethyl ether, or 1H,1H,2'H-perfluorodipropyl ether, and such non-aqueous solvents may be used alone or in combination.

The lithium salt is not particularly limited, as long as it is a compound capable of providing lithium ions used in a lithium-ion secondary battery. Particular examples of the lithium salt include, but are not limited to: $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like. Such lithium salts may be used alone or in combination. For example, the lithium salt may be present in the electrolyte at a concentration of 0.1-3.0 M. When the concentration of the lithium salt falls within the above-defined range, the electrolyte has suitable conductivity and viscosity and shows excellent electrolyte quality, and thus lithium ions can be transported effectively.

Additives may be used optionally in order to improve the life characteristics of a battery, to inhibit degradation of the capacity of a battery and to improve the discharge capacity of a battery. Particular examples of the additives include, but are not limited to: haloalkylene carbonate-based compounds, such as difluoroethylene carbonate; pyridine; triethyl phosphite; triethanolamine; cyclic ethers; ethylene diamine; n-glyme; triamide hexaphosphate; nitrobenzene derivatives; sulfur; quinonimine dyes; N-substituted oxazolidinone; N,N-substituted imidazolidine; ethylene glycol diallyl ether; ammonium salts; pyrrole; 2-methoxyethanol; aluminum trichloride, or the like. Such additives may be used alone or in combination. The additives may be used in an amount of 0.1-10 wt %, preferably 0.1-5 wt %, based on the total weight of the electrolyte.

There is no particular limitation in the shape of the lithium-sulfur battery. For example, the lithium-sulfur battery may have various shapes, including a cylindrical shape, a stacked shape, a coin-like shape, or the like.

In yet another aspect of the present disclosure, there is provided a battery module which includes the lithium-sulfur battery as a unit cell. The battery module may be used as a power source of middle- to large-scale devices requiring high-temperature stability, long cycle characteristics, high capacity characteristics, or the like.

Particular examples of the device include, but are not limited to: power tools driven by the power of an electric motor; electric cars, including electric vehicles (EVs), hybrid electric vehicles (HEVs), plug-in hybrid electric vehicles (PHEVs), or the like; electric two-wheeled vehicles, including E-bikes and E-scooters; electric golf carts; electric power storage systems; or the like.

EXAMPLES

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

PREPARATION EXAMPLES

Preparation Example 1

Activated carbon having a BET specific surface area of 2,900 $m^2/g$ was mixed homogeneously with sulfur ($S_8$) at a weight ratio of 30:70, and the resultant mixture was pulverized through ball milling and allowed to stand in an oven at 155° C. for 30 minutes to obtain a sulfur-carbon composite.

Preparation Example 2

Activated carbon (10 g) having a BET specific surface area of 1,600 $m^2/g$ was mixed homogeneously with sulfur ($S_8$) at a weight ratio of 40:60, and the resultant mixture was pulverized through ball milling and allowed to stand in an oven at 155° C. for 30 minutes to obtain a sulfur-carbon composite.

Preparation Example 3

Activated carbon (10 g) having a BET specific surface area of 3,000 $m^2/g$ was mixed homogeneously with sulfur (S8) at a weight ratio of 40:60, and the resultant mixture was pulverized through ball milling and allowed to stand in an oven at 155° C. for 30 minutes to obtain a sulfur-carbon composite.

Preparation Example 4

Activated carbon (10 g) having a BET specific surface area of 1,600 $m^2/g$ was mixed homogeneously with sulfur (S8) at a weight ratio of 30:70, and the resultant mixture was pulverized through ball milling and allowed to stand in an oven at 155° C. for 30 minutes to obtain a sulfur-carbon composite.

TABLE 1

| | BET specific surface area ($m^2$/g) | Content of sulfur based on 100 wt % of sulfur-carbon composite (wt %) | Content of carbonaceous material based on 100 wt % of sulfur-carbon composite (wt %) | Pores having diameter of less than 3 nm in carbonaceous material (vol %) | SCP |
|---|---|---|---|---|---|
| Prep. Ex. 1 | 2,900 $m^2$/g | 70 | 30 | 88 vol % | 0.93 |
| Prep. Ex. 2 | 1,600 $m^2$/g | 60 | 40 | 40 vol % | 0.71 |
| Prep. Ex. 3 | 3,000 $m^2$/g | 60 | 40 | 90 vol % | 0.78 |
| Prep. Ex. 4 | 1,600 $m^2$/g | 70 | 30 | 40 vol % | 0.83 |

In Table 1, SCP is a value calculated according to the above Formula 1.

EXAMPLES AND COMPARATIVE EXAMPLES

Example 1

First, 90 wt % of the sulfur-carbon composite (first sulfur-carbon composite) obtained from Preparation Example 1 mixed homogeneously with the sulfur-carbon composite (second sulfur-carbon composite) obtained from Preparation Example 2 at a weight ratio of 8:2, as a positive electrode active material, and 5 wt % of denka black as a conductive material and 5 wt % of styrene butadiene rubber/carboxymethyl cellulose (weight ratio of SBR:CMC=7:3) as biner were introduced to a solvent and mixed therein to prepare a positive electrode slurry composition.

The resultant positive electrode slurry composition was applied to an aluminum current collector (thickness: 20 μm) to a thickness of 350 μm and dried at 50° C. for 12 hours to remove the solvent, and then pressing was carried out by using a roll press to obtain a positive electrode.

Lithium metal foil having a thickness of 35 μm was used as a negative electrode together with the positive electrode. In addition, as an electrolyte, a mixed solution containing 1M lithium bis(trifluoromethanesulfonyl)imide (LiTFSI) dissolved in an organic solvent including dimethyl ether and 1,2,2,2-tetrafluoroethyl trifluoromethyl ether (volume ratio of DME:TTE=1:1) was used.

Particularly, the positive electrode and the negative electrode were disposed in such a manner that they might face each other, polyethylene having a thickness of 20 μm and a porosity of 45 vol % was disposed between both electrodes as a separator, and then 70 μL of the electrolyte prepared as mentioned above was injected thereto to obtain a lithium-sulfur battery.

Example 2

A lithium-sulfur battery was obtained in the same manner as Example 1, except that the sulfur-carbon composite obtained from Preparation Example 1 mixed homogeneously with the sulfur-carbon composite obtained from Preparation Example 2 at a weight ratio of 7:3 was used as a positive electrode active material.

Example 3

A lithium-sulfur battery was obtained in the same manner as Example 1, except that the sulfur-carbon composite obtained from Preparation Example 1 mixed homogeneously with the sulfur-carbon composite obtained from Preparation Example 2 at a weight ratio of 5:5 was used as a positive electrode active material.

Comparative Example 1

A lithium-sulfur battery was obtained in the same manner as Example 1, except that only the sulfur-carbon composite obtained from Preparation Example 1 was used as a positive electrode active material.

Comparative Example 2

A lithium-sulfur battery was obtained in the same manner as Example 1, except that the sulfur-carbon composite (first sulfur-carbon composite) obtained from Preparation Example 1 mixed homogeneously with the sulfur-carbon composite (second sulfur-carbon composite) obtained from Preparation Example 2 at a weight ratio of 9:1 was used as a positive electrode active material.

Comparative Example 3

A lithium-sulfur battery was obtained in the same manner as Example 1, except that the sulfur-carbon composite (first sulfur-carbon composite) obtained from Preparation Example 1 mixed homogeneously with the sulfur-carbon composite (second sulfur-carbon composite) obtained from Preparation Example 3 at a weight ratio of 5:5 was used as a positive electrode active material.

Comparative Example 4

A lithium-sulfur battery was obtained in the same manner as Example 1, except that the sulfur-carbon composite (first sulfur-carbon composite) obtained from Preparation Example 1 mixed homogeneously with the sulfur-carbon composite (second sulfur-carbon composite) obtained from Preparation Example 4 at a weight ratio of 5:5 was used as a positive electrode active material.

Comparative Example 5

A lithium-sulfur battery was obtained in the same manner as Example 1, except that only the sulfur-carbon composite obtained from Preparation Example 2 was used as a positive electrode active material.

TABLE 2

| Examples | Use of sulfur-carbon composite (wt %) Prep. Ex. 1 | Prep. Ex. 2 | Prep. Ex. 3 | Prep. Ex. 4 | Total (wt %) |
|---|---|---|---|---|---|
| Ex. 1 | 80 | 20 | — | — | 100 |
| Ex. 2 | 70 | 30 | — | — | 100 |
| Ex. 3 | 50 | 50 | — | — | 100 |
| Comp. Ex. 1 | 100 | — | — | — | 100 |
| Comp. Ex. 2 | 90 | 10 | — | — | 100 |
| Comp. Ex. 3 | 50 | — | 50 | — | 100 |
| Comp. Ex. 4 | — | 50 | — | 50 | 100 |
| Comp. Ex. 5 | — | 100 | — | — | 100 |

TABLE 3

| | Life Arrive at capacity retention of 80% (cycle number) | Output ratio (%) |
|---|---|---|
| Ex. 1 | 100 | 88 |
| Ex. 2 | 105 | 89 |
| Ex. 3 | 127 | 89 |
| Comp. Ex. 1 | 77 | 85 |
| Comp. Ex. 2 | 81 | 86 |
| Comp. Ex. 3 | 83 | 85 |
| Comp. Ex. 4 | 70 | 73 |
| Comp. Ex. 5 | 128 | 86 |

Test Example 1: Evaluation of Physical Properties of Carbonaceous Materials

The specific surface area, total pore volume and average pore diameter of the carbonaceous materials used in Preparation Examples were determined. Particularly, the carbonaceous material used in each Preparation Example was determined for nitrogen adsorption and desorption under vacuum by using a specific surface area analyzer (model name BELSORP-MINI, available from BEL Japan Inc.). Then, an adsorption/desorption curve was obtained therefrom, and the specific surface area based on the Brunaure-Emmett-Teller (BET) method, total pore volume, and volume of pores having a diameter of less than 3 nm were calculated.

Test Example 2: Evaluation of Life Characteristics

Each battery was subjected to activation processes three times by using a battery charger (available from PNE) under a constant temperature condition of 25° C. at 0.1 C/0.1 C rate in a voltage range of 1.0-3.6 V, and the life characteristics at 0.3 C/0.5 C rate were evaluated. When the capacity retention arrived at 80% based on the discharge capacity at the $4^{th}$ cycle, the cycle number was counted.

Test Example 3: Output Ratio

Each battery was subjected to three cycles of activation processes under a constant temperature condition of 25° C. at 0.1 C/0.1 C rate in a voltage range of 1.0-3.6 V, and the cycle characteristics were evaluated under a charge/discharge condition of 03 C/0.5 C.

Output ratio: {$12^{th}$ output energy (0.5 C rate discharge capacity×nominal voltage)÷$3^{rd}$ output energy (0.1 C rate discharge capacity×nominal voltage)}×100(%)

In Preparation Examples 1-4, Preparation Examples 1 and 3 meet the conditions of the first carbonaceous material according to the present disclosure, and Preparation Examples 2 and 4 meet the conditions of the second carbonaceous material according to the present disclosure.

As shown in Table 2, the lithium-sulfur battery according to each of Examples 1-3 was obtained by mixing the sulfur-carbon composites obtained from Preparation Examples 1 and 2 at a predetermined ratio. Therefore, as shown in Table 3, it is shown that the lithium-sulfur battery according to each of Examples 1-3 maintains a capacity retention of 80% or more and an output ratio of 88% or more even at the $100^{th}$ cycle.

On the contrary, the lithium-sulfur battery according to each of Comparative Examples 1 and 3, obtained by using only the first carbonaceous material of the present disclosure, the lithium-sulfur battery according to Comparative Example 4, obtained by using only the second carbonaceous material of the present disclosure, and the lithium-sulfur battery according to Comparative Example 2, obtained by using the first carbonaceous material and the second carbonaceous material at a mixing ratio that does not fall within the range as defined by the present disclosure, show a significantly smaller cycle number arriving at a capacity retention of 80% and a lower output ratio, as compared to Examples 1-3.

Meanwhile, in the case of Comparative Example 5 using only the second carbonaceous material according to the present disclosure, the lithium-sulfur battery shows a slightly lower output ratio, although it does not show a decrease in capacity retention.

What is claimed is:

1. A positive electrode for a lithium-sulfur battery, the positive electrode including a positive electrode active material comprising a mixture of a first sulfur-carbon composite and a second sulfur-carbon composite, wherein the first sulfur-carbon composite comprises a first porous carbonaceous material and sulfur, and the first carbonaceous material has a BET specific surface area of 1,600 $m^2/g$ or more and 80 vol % or more of pores having a diameter of less than 3 nm based on 100 vol % of the total pores, and the second sulfur-carbon composite comprises a second porous carbonaceous material and sulfur, and the second carbonaceous material has a BET specific surface area of equal to or larger than 1,000 $m^2/g$ and less than 1,600 $m^2/g$ and 50 vol % or less of pores having a diameter of less than 3 nm based on 100 vol % of the total pores.

2. The positive electrode according to claim 1, wherein the first carbonaceous material has a BET specific surface area of 2,000 $m^2/g$ or more.

3. The positive electrode according to claim 1, wherein the first carbonaceous material comprises activated carbon.

4. The positive electrode according to claim 2, wherein the first carbonaceous material comprises activated carbon in an amount of 95 wt % or more based on 100 wt % or the first carbonaceous material.

5. The positive electrode according to claim 1, wherein the first sulfur-carbon composite is present in an amount of less than 90 wt % based on 100 wt % of the first sulfur-carbon composite and the second sulfur-carbon composite.

6. The positive electrode according to claim 1, wherein the first sulfur-carbon composite has an SCP value of larger than 0.65 and less than 1, and the second sulfur-carbon composite has an SCP value of larger than 0.55 and less than $0.85_T$ as defined by the following Formula 1:

SCP=Sulfur content ratio (*A*)±Pore volume ratio of carbonaceous material (*B*) [Formula 11 wherein A represents a ratio of a weight of sulfur based on a weight of the carbon-sulfur composite, and B represents a ratio of pore volume in the carbonaceous material based on the apparent volume of the carbonaceous material.

7. The positive electrode according to claim 1, wherein the positive electrode active material comprises the first sulfur-carbon composite and the second sulfur-carbon composite in an amount of 70 wt % or more based on 100 wt % of the positive electrode active material.

8. The positive electrode according to claim 1, wherein each of the first sulfur-carbon composite and the second sulfur-carbon composite is one or more of a composite formed through simple mixing of sulfur with the carbonaceous material, a coated composite having a core-shell structure, or a composite comprising sulfur packed in the internal pores of the carbonaceous material.

9. The positive electrode according to claim 1, wherein the positive electrode active material further comprises a binder resin and a conductive material.

10. A lithium-sulfur battery comprising the positive electrode according to claim 1, a negative electrode, a separator between the positive electrode and the negative electrode, and an electrolyte, wherein the electrolyte comprises one or more selected from a cyclic ether, a linear ether and a fluorinated ether.

* * * * *